INVENTOR
TATSUO KURATOMI

BY *Otto John Musay*
ATTORNEY

United States Patent Office 3,468,119
Patented Sept. 23, 1969

3,468,119
STEEL-CORED ROD AS A COMPONENT OF AN ALUMINUM CABLE, THE CABLE AND PROCESS OF MAKING THE ROD
Tatsuo Kuratomi, Chigasaki-shi, Japan, assignor to Takeo Kagitani, Minato-ku, Tokyo, Japan
Filed May 31, 1967, Ser. No. 642,423
Claims priority, application Japan, Dec. 27, 1966, 41/85,354
Int. Cl. D07b 1/06; C23c 11/10, 11/14
U.S. Cl. 57—145                                    9 Claims

ABSTRACT OF THE DISCLOSURE

In an aluminum cable at least one steel wire having the core comprising a steel rod, a film of ferric sulphuric oxide surrounding said rod and integrally bonded therewith and as an outer conductor an aluminum layer covering the outer periphery of said film.

An aluminum cable comprising at least one of said steel wires and a plurality of aluminum wires covering the outer periphery of said at least one steel wire.

A process for producing the steel wire mentioned above comprising the steps of heating the rod to a temperature of about 700° C. in air, oxygen or steam until a film of ferric ferrous oxides is formed on the rod providing an outer aluminum layer over said film.

Field of the invention

This invention relates to steel-cored aluminum cables.

Summary of the invention

An object of the present invention is to provide a steel-cored aluminum-covered cable or a steel-cored and stranded aluminum cable made by combining a steel core to bear the tension of such a cable and component aluminum wires or a covering aluminum layer to perform the function of a conductor.

According to the present invention, a steel-cored wire for an aluminum-covered cable is made by strongly heating a steel wire in air or oxygen gas or passing a strongly heated component steel wire through steam so that the surface skin of the steel wire forms a film of ferric ferrous oxide and covering it with a layer of aluminum. A steel-cored and stranded aluminum cable is formed by stranding several core steel wires treated as mentioned above together so as to form a steel core and stranding many component aluminum wires on the outer periphery of said steel core so as to provide several layers.

Another object of the invention is to provide an aluminum cable having steel rod core members, which avoids the generation of voltage differences between the two metals due to normal temperature differences, called battery action.

Other objects of the invention will become apparent from the following drawings and specification.

Brief description of the drawings

In the accompanying drawings.

Description of the preferred embodiments

Figure 1:
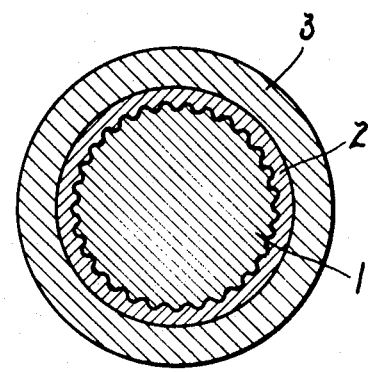
FIG. 1 is an enlarged cross-sectional view showing a steel wire embodying the present invention and
FIG. 2 is an enlarged cross-sectional view of a cable embodying the present invention.

The present invention shall be detailed with reference to the accompanying drawings wherein like reference characters designate like or corresponding parts throughout the views there is shown in FIG. 1, a steel-cored aluminum-covered steel wire is made by strongly heating a component steel wire to about 700° C. in air or oxygen gas or passing a component steel wire heated to about 700° C. through steam so that the surface skin part of the component steel wire may be converted to a film 2 of ferric ferrous oxide and covering it as a core on the outer periphery with a layer of aluminum or aluminum wires so as to form a covering aluminum layer 3.

Figure 2:
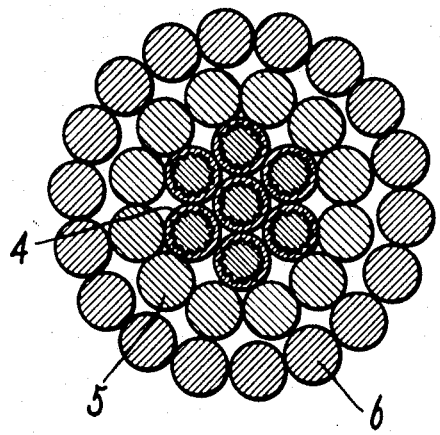

In FIG. 2 a steel-cored stranded aluminum cable is shown embodying the present invention. A steel-cored and stranded aluminum cable is made by stranding several component core steel wires 4 having skins parts converted into films of ferric ferrous oxide in the same manner as is mentioned above, so and by stranding many component aluminum wires 5 on the outer periphery of said steel core and further stranding many component aluminum wires 6 on the outer periphery of wires 5.

The chemically stable film of ferric ferrous oxide obtained by oxidizing the surface skin part of the component steel wire has an insulating effect of preventing the generation of an anodizing action by mechanically interrupting the contact of the steel core with the covering aluminum layer or of the stranded steel core with the component aluminum wires and also electrically insulating them from each other.

What is claimed is:
1. A steel wire comprising a steel rod, a film of ferric ferrous oxide surrounding said rod integrally bonded therewith and an outer conductor of an aluminum layer covering the outer periphery of said film.
2. A steel wire as claimed in claim 1, said core being longitudinally crimped.
3. A steel wire as claimed in claim 1, said aluminum layer being aluminum wires.
4. A steel cored aluminum cable comprising as its core at least one steel rod having insulator film of ferric ferrous oxide bonded on its surface and an aluminum layer covering the outer periphery of said film, and at least one layer of aluminum wires surrounding said at least one steel rod.
5. A steel cored aluminum cable as claimed in claim 4, said at least one steel rod being a plurality of rods.
6. A steel cored aluminum cable as claimed in claim 3, said aluminum layer being formed of a plurality of aluminum wires.
7. A process for the production of a steel wire comprising the steps of heating an elongated steel rod to about 700° in oxygen until the surface of said rod is converted into an insulating film of ferric ferrous oxide and covering said film with a layer of aluminum.
8. A process for the production of a steel wire comprising the steps of heating said rod to about 700° C. in air until the surface of said rod is converted into an insulating film of ferric ferrous oxide and covering said film with a layer of aluminum.
9. A process for the production of a steel wire comprising the steps of heating said rod to about 700° C. and of drawing said heated rod through steam until an insulating film of ferric ferrous oxide is formed thereon and of covering said film with an aluminum layer.

References Cited

UNITED STATES PATENTS

| | | | |
|---|---|---|---|
| 1,904,116 | 4/1933 | Baum | 57—145 XR |
| 2,138,420 | 11/1938 | Glasser et al. | 57—145 |
| 2,444,422 | 7/1948 | Bradford | 148—6.35 XR |
| 2,542,043 | 2/1951 | McIntyre | 148—6.35 XR |
| 2,543,710 | 2/1951 | Schmidt et al. | 148—6.35 |
| 2,816,415 | 12/1957 | Lappala | 57—145 |
| 2,898,251 | 8/1959 | Treder et al. | 148—6.35 |

DONALD E. WATKINS, Primary Examiner

U.S. Cl. X.R.
57—161; 148—6.35

UNITED STATES PATENT OFFICE
CERTIFICATE OF CORRECTION

Patent No. 3,468,119                                   September 23, 1969

Tatsuo Kuratomi

It is certified that error appears in the above identified patent and that said Letters Patent are hereby corrected as shown below:

In the heading to the printed specification, line 5, "assignor to" should read -- assignor of one-half to --.

Signed and sealed this 21st day of April 1970.

(SEAL)
Attest:

Edward M. Fletcher, Jr.

Attesting Officer

WILLIAM E. SCHUYLER, JR.

Commissioner of Patents